May 19, 1970  R. F. PARIS  3,512,829
REINFORCED, CUSHIONED TRAY FOR INFANT SEAT
Filed March 21, 1968

INVENTOR
ROY F. PARIS
BY
*Cohn and Powell*
ATTORNEYS

United States Patent Office 3,512,829
Patented May 19, 1970

3,512,829
REINFORCED, CUSHIONED TRAY FOR INFANT SEAT
Roy F. Paris, Bethalto, Ill., assignor to The Welsh Co., St. Louis, Mo., a corporation of Missouri
Filed Mar. 21, 1968, Ser. No. 718,978
Int. Cl. A47b 39/00
U.S. Cl. 297—148                   8 Claims

ABSTRACT OF THE DISCLOSURE

The reinforced, cushioned tray includes a peripheral rim having a U-shaped bent portion interconnected by a yieldable band portion. A U-shaped frame reinforces the interior of the bent portion and the bent portion includes padding embracing the U-shaped frame. The bottom of the tray is provided by a two-ply panel, the plies being marginally connected to the peripheral rim.

A method is disclosed for forming a reinforced, cushioned tray which includes molding a plastic sheet into an upper shell, reinforcing and padding the shell, and heat-sealing a reinforcing panel to shell.

BACKGROUND OF THE INVENTION

This invention relates generally to a cushioned tray, and more particularly to a reinforced cushioned tray supported on a frame.

In general, trays of the type described find their greatest use on auxiliary automobile chairs for infants, high chairs, strollers and walkers. In the known art, such trays have been essentially independent tray units constructed of a rigid material such as wood, plastic or aluminum, the trays being mounted on a pair of extended side arms. In effect, such trays maintain the side arms in a spaced condition, and hence it is necessary for them to be rigid. Of course in achieving such rigidity, the peripheral rim of the tray is essentially performing the function of a structural rib and hence, according to the dictates of structural economy, it is usually hard and narrow. Such a design provides several sharp adges against which an infant can injure himself. Of course it is undoubtedly possible to pad such trays, but the provision of such padding would represent an additional expense. The present tray represents a departure from the concept of utilizing an independent tray for holding together the side arms, and by doing so effects economies not known in the known prior art.

SUMMARY OF THE INVENTION

Essentially, the present tray is built onto a U-shaped tubular frame, which provides a reinforcing member for the tray and, in addition, has a structural integrity of its own independently of the tray.

In particular, the tray has the advantage of being padded and yet has part of the rim, the part with which a child is first likely to come into contact, of a flexible and yieldable nature so that should a child bump or knock himself against this member, he will suffer no injury because the member will yield on a relatively slight impact.

The reinforced cushioned tray includes a peripheral rim having a substantially U-shaped bent portion with spaced ends, and a yieldable band portion extending between these ends. A substantially U-shaped frame inside of the bent portion reinforces this portion. The frame includes a pair of arms extending outwardly from the spaced ends. The bent portion includes padding means embracing the U-shaped frame. Panel means marginally connected to the peripheral rim forms the bottom of the tray. The peripheral rim includes inner and outer sidewalls, and the panel means includes a first ply marginally connecting the inner sidewalls and a second ply marginally connecting the outer sidewalls. The first and second plies are sealed together.

The bent portion includes a shell cover, substantially U-shaped in cross section providing inner and outer sidewalls adjacent to the padding means, and the band portion is substantially U-shaped in cross section providing inner and outer sidewalls having cushioning means sandwiched therebetween. The sidewalls of the bent portion, the sidewalls of the band portion and the first ply of the panel means are integrally formed. The band portion of the peripheral rim includes a free upper edge which is movable relative to the lower edge and yieldable on impact.

A method of forming a reinforced, cushioned tray includes the steps of forming a U-shaped frame, padding the bight of the frame, molding a plastic sheet into an upper shell including a peripheral rim portion having a U-shaped cross section and including inner and outer sidewalls, connecting the inner sidewalls marginally to the panel portion, the rim portion including a bight portion and extending a band portion across a bight portion of the rim portion, forming opposed apertures in the shell receiving the frame arm, fitting the bight portion of the rim over the padded frame bight and overlaying the padded frame and shell on a plastic reinforcing panel, and then sealing the reinforcing panel to the outer sidewall.

The interior of the band portion is padded before such sealing, and additional sealing is applied, joining the reinforcing panel to the panel portion of the shell.

DESCRIPTION OF THE PREFERRED EMBODIMENT

Figure 1:
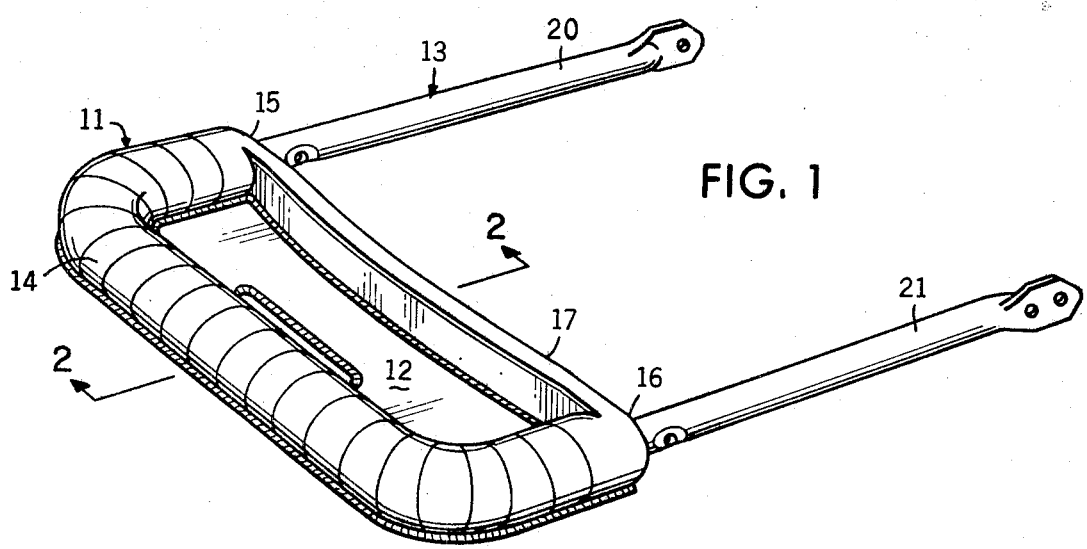
FIG. 1 is a perspective view of the reinforced cushioned tray.

Referring now by characters of reference to the drawings, and first to FIG. 1, it will be understood that the reinforced cushioned tray generally indicated by numeral 10 includes an upstanding peripheral rim 11, a bottom portion 12, constituting a panel means, and a reinforcing, U-shaped frame 13.

The peripheral rim 11 includes a substantially U-shaped bent portion 14 having spaced ends 15 and 16, and a yieldable band portion 17 extending between the ends 15 and 16.

It will be understood that the bight of the U-shaped frame 13 reinforces the bent portion 14 of the peripheral rim 11. The U-shaped frame 13 includes a pair of arms 20 and 21 which extend outwardly from the spaced ends 15 and 16 respectively. The U-shaped frame 13 will normally be a component part of a child's car chair, high chair or the like. The end of each arm 20 and 21 is adapted for this purpose.

Figure 2:
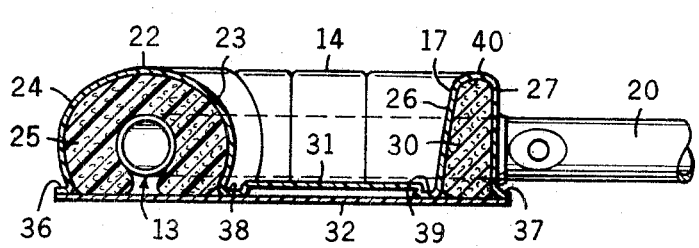
FIG. 2 is an enlarged fragmentary cross sectional view taken on line 2—2 of FIG. 1 illustrating the construction of the rim.

From FIG. 2, it is seen that the bent portion 14 of the upstanding peripheral rim 11 includes a shell cover 22, substantially U-shaped in cross section and, having inner and outer sidewalls 23 and 24. The bent portion 14 is padded between the shell cover 22 and the reinforcing tubular frame 13. A polyurethane strip 25 constitutes the padding means in the present embodiment, the strip 25 being sandwiched between the shell cover 22 and the tubular frame 13.

The band portion 17 of the peripheral rim 11 is also substantially U-shaped in cross section in the preferred embodiment and is likewise provided with inner and outer sidewalls 26 and 27 respectively. The band portion 17 is intended to be flexible and is provided with a thin cushion strip 30, constituting a cushioning means, disposed between inner and outer sidewalls 26 and 27. A cushion strip 30 having a wood fiber base has been found suitable for this purpose.

The bottom of the tray 12 includes a panel portion 31 constituting a first ply and a reinforcing panel portion 32 constituting a second ply, the two plies acting together to constitute a panel means forming the bottom of the tray 12.

Figure 4:
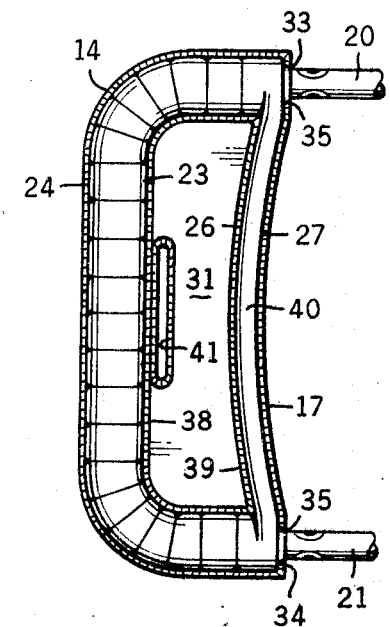

As is clear from FIG. 4, the panel portion 31 marginally connects the inner sidewalls 23 of the bent portion 14 and the inner sidewall 26 of the band portion 17 so that the inner sidewall elements of the peripheral rim 11 and the panel portion 31 are integral. In addition, the inner and outer sidewalls 26 and 27 of the band portion 17 are joined to the inner and outer sidewalls 23 and 24 of the bent portion so that the outstanding peripheral rim has substantially continuous inner and outer sidewalls. It is to be understood that the end portions of the outer walls 27 of the band 17 also provide closure ends 33 and 34 for the bent portion 14. Each closure end 33 and 34 includes an aperture 35 receiving the extended arms 20 and 21 of the frame 13.

Figure 3:
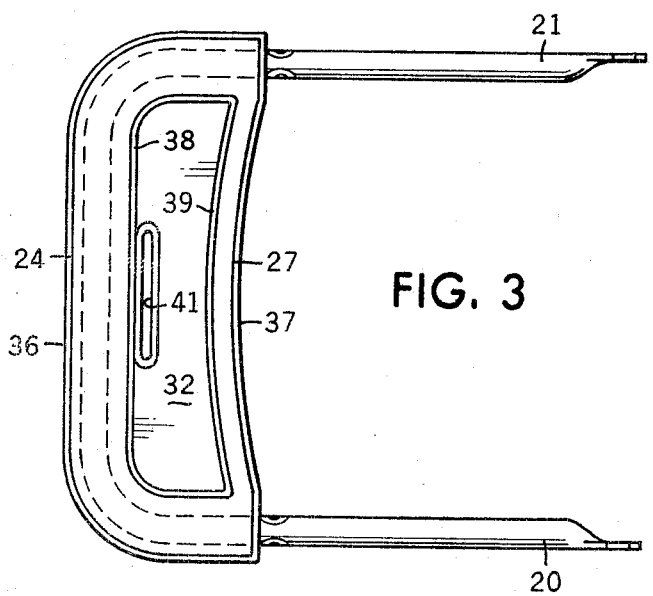
FIGS. 3 and 4 are plan views on the underside and upperside of the tray respectively.

FIG. 3 indicates that the reinforcing panel portion 32, which constitutes a second ply, is marginally connected to the outer sidewalls 24 and 27 of the bent portion 14 and the band portion 17 respectively by means of heat-sealing said sidewalls and reinforcing panel together along the peripheral edges 36 and 37. Further, the reinforcing panel 32 is heat-sealed to the panel portion 31 along the integration lines 38 and 39 between the inner sidewalls 23 and 26 of the bent portion 14 and the band portion 17 respectively.

It will be understood that the construction of the band portion 17 renders it relatively pliable, and in particular the free upper edge 40 of the band portion is movable relative to the lower edge 37 and is yieldable on impact. The band portion 17 is, of course, the portion of the tray 10 which would be nearest to an infant in the event that the tray is used in a car chair, and the yieldable feature thus provides a considerable factor of safety in the event that the child is thrown forward. In fact, the bottom of the tray itself is preferably somewhat yieldable also in its middle portion, thus augmenting this important safety feature. The panel bottom portion 12 of the present tray includes a sealed slot 41 for receiving a strap (not shown).

The outer cover 22 of the peripheral rim 11, which is provided in part by the inner and outer sidewalls 23, 24, 26 and 27 and likewise the panel portion 31 and the reinforcing panel portion 32 constituting the bottom of the tray, are satisfactorily constructed of semi-rigid vinyl. It is to be understood, of course, that such parts may be formed from leather or other suitable material without affecting the features of the tray as described above. However, when vinyl or similar plastic is used, a novel method of forming the reinforced, cushioned tray can be utilized.

An elongate tube is formed into a U-shaped frame 13 having a bight portion and a pair of arms 20 and 21. The bight portion of this frame 13 is padded with a folded strip 25 of polyurethane material.

A plastic sheet of semi-rigid vinyl is molded into an upper shell which includes a panel portion 31 and a peripheral rim 11. The rim portion 11 includes a bight, or bent portion 14, conforming to the configuration of the padded bight. A band portion is extended across the bight of the rim 11. The rim 11 has a substantially U-shaped cross section, including inner sidewalls 23 and 26 and outer sidewalls 24 and 27. The inner sidewalls 23 and 26 are marginally connected to the panel portion 31 which forms part of the bottom of the tray. The upper shell so formed is clearly illustrated in FIG. 1.

Formed into the outer sidewall 27 of the band portion 17 are a pair of apertures 35 spaced to register with the arms 20 and 21 of the tubular frame 13. It will be observed from FIG. 4 that the ends of the outer sidewall 27 form closure ends 33 and 34 for the bight of the rim 11, and that apertures 35 are located within this closure and area.

The apertures 36 receive the frame arms 20 and 21, that is to say the arms 20 and 21 are threaded through the apertures 35 until the bight of the rim and the bight of the padded frame correspond. The former is then fitted over the latter.

The padded frame complete with the shell is overlaid on a plastic reinforcing panel portion 32 and placed in register therewith. The reinforcing panel 32 is heat-sealed to the peripheral edges 36 and 37 of the peripheral rim 11. The panel portion 31 of the shell and the reinforcing panel portion 32 are also heat-sealed together along a line substantially corresponding with the line of integration 38, 39 between the inner sidewall of the rim 11 and the panel portion 31. These heat-seals are clearly shown in FIGS. 3 and 4.

In the preferred embodiment the band portion 17 is interiorly filled with a fibrous cushioning material strip 30 before the sealing operation is accomplished.

I claim as my invention:

1. A reinforced cushioned tray, comprising:
 (a) an upstanding peripheral rim including:
  (1) a substantially U-shaped bent portion having spaced ends, and
  (2) a yieldable band portion extending between the ends,
 (b) a subtsantially U-shaped frame inside of and reinforcing the bent portion and including a pair of arms extending outwardly from the spaced ends,
 (c) the bent portion including padding means embracing the U-shaped frame,
 (d) panel means marginally connected to the peripheral rim to form the bottom of the tray,
 (e) the peripheral rim including inner and outer sidewalls,
 (f) the panel means including a first ply marginally connecting the inner siewalls, and
 (g) the panel means including a second ply marginally connecting the outer sidewalls and overlapping the first ply.

2. A reinforced cushioned tray, comprising:
 (a) an upstanding peripheral rim including:
  (1) a substantially U-shaped bent portion having spaced ends, and
  (2) a yieldable band portion extending between the ends,
 (b) a substantially U-shaped frame inside of and reinforcing the bent portion and including a pair of arms extending outwardly from the spaced ends,
 (c) the bent portion including padding means embracing the U-shaped frame,
 (d) panel means marginally connected to the peripheral rim to form the bottom of the tray,
 (e) the peripheral rim including inner and outer sidewalls,
 (f) the panel means including a first ply marginally connecting the inner sidewalls and a second ply marginally connecting the outer sidewalls, and
 (g) the first and second plies being sealed together.

3. A reinforced cushioned tray, comprising:
 (a) an upstanding peripheral rim including:
  (1) a substantially U-shaped bent portion having spaced ends, and
  (2) a yieldable band portion extending between the ends,
 (b) a substantially U-shaped frame inside of and reinforcing the bent portion and including a pair of arms extending outwardly from the spaced ends,
(c) the bent portion including padding means embracing the U-shaped frame,
(d) panel means marginally connected to the peripheral rim to form the bottom of the tray,
(e) the bent portion including a shell cover, having inner and outer sidewalls, and
(f) the band portion including a lower edge joined to the panel means and a free upper edge movable relative to the lower edge and yieldeable on impact.

4. A tray as defined in claim 3, in which:
(g) the band portion includes inner and outer sidewalls,
(h) the inner sidewalls of the bent portion and the band portion are joined, and
(i) the panel means includes a first ply marginally connecting the inner sidewalls of the bent portion and the band portion.

5. A reinforced cushioned tray, comprising:
(a) an upstanding peripheral rim including:
  (1) a substantially U-shaped bent portion having spaced ends, and
  (2) a yieldable band portion extending between the ends,
(b) a substantially U-shaped frame inside of and reinforcing the bent portion and including a pair of arms extending outwardly from the spaced ends,
(c) the bent portion including padding means embracing the U-shaped frame,
(d) panel means marginally connected to the peripheral rim to form the bottom of the tray,
(e) the bent portion including a shell cover substantially U-shaped in cross section providing inner and outer sidewalls adjacent to the padding means,
(f) the band portion being substantially U-shaped in cross section providing inner and outer sidewalls, and
(g) the band portion including cushion means between its inner and outer sidewalls.

6. A reinforced cushioned tray, comprising:
(a) an upstanding peripheral rim including:
  (1) a substantially U-shaped bent portion having spaced ends, and
  (2) a yieldable band portion extending between the ends,
(b) a substantially U-shaped frame inside of and reinforcing the bent portion and including a pair of arms extending outwardly from the spaced ends,
(c) the bent portion including padding means embracing the U-shaped frame,
(d) panel means marginally connected to the peripheral rim to form the bottom of the tray,
(e) the bent portion of the rim including a shell cover substantially U-shaped in cross section providing inner and outer sidewalls adjacent to the padding means,
(f) the band portion being substantially U-shaped in cross section providing inner and outer sidewalls, and
(g) the panel means including a first ply, marginally connecting the inner sidewalls of the bent portion and the band portion, and a second ply overlaying the first ply and marginally connecting the outer sidewalls of the bent portion and the band portion.

7. A tray as defined in claim 6, in which:
(h) the band portion includes cushioning means between its inner and outer sidewalls, and
(i) the panel plies are sealed together.

8. A tray as defined in claim 7, in which:
(j) the inner sidewall of the bent portion, the inner sidewall of the band portion and the first ply of the panel means are integral, and
(k) the band portion includes a free outer edge movable relative to the line of integration between the band portion and the first ply of the panel means and yieldable on impact.

References Cited
UNITED STATES PATENTS

| | | | |
|---|---|---|---|
| 2,177,297 | 10/1939 | Brazell | 297—154 |
| 2,807,312 | 9/1957 | Florian | 297—154 X |
| 3,109,666 | 11/1963 | Wilson | 297—148 X |
| 3,146,738 | 9/1964 | Telarico | 297—154 X |
| 3,245,717 | 4/1966 | Levy | 297—254 |

JAMES T. McCALL, Primary Examiner

U.S. Cl. X.R.

297—390